Jan. 27, 1953     S. HANSEN     2,627,040
STEPPING MOTOR
Filed Aug. 1, 1950
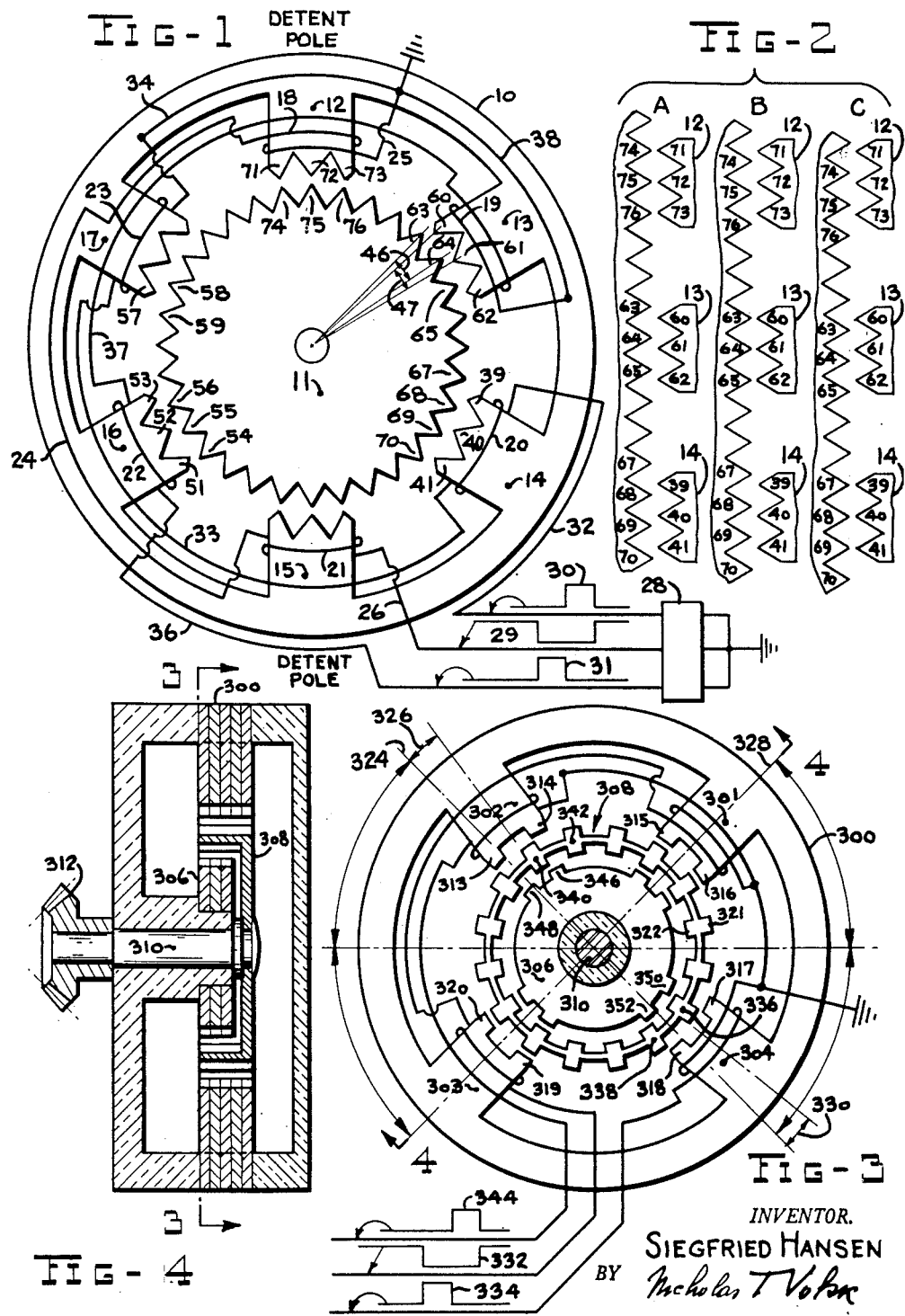
INVENTOR.
SIEGFRIED HANSEN
BY Nicholas T. Volk
ATTORNEY Patented Jan. 27, 1953

2,627,040

UNITED STATES PATENT OFFICE 2,627,040

STEPPING MOTOR

Siegfried Hansen, Los Angeles, Calif.

Application August 1, 1950, Serial No. 177,070

4 Claims. (Cl. 310—49)

This invention relates to stepping motors or motors in which the angle of position of rotors may be controlled by a series of pulses. The motors may be rotated clockwise or counter-clockwise, depending upon the sequence of the pulses impressed upon them. Some of the pulses are used for changing the angle of position of the rotor by a predetermined angle, while other pulses are used for holding the rotor in a fixed position with respect to its stator when it is desired to keep the rotor at rest.

The devices known to the prior art, which are capable of performing the same function, are conventional electro-mechanical counters which employ a magnetically actuated pawl and ratchet system to turn a counter mechanization. Such devices have a short life and are very difficult to build when pulses impressed on such devices reach a rate of the order of 100 per second or higher rates.

The invention discloses a pulse-counting motor which is relatively easy to build, and which has no high-speed moving parts to cause wear. The disclosed motors are positive in operation and fast acting because the mass of the rotating parts is extremely small and it is caused to rotate or change its angular position by changing the reluctance in the magnetic circuit, with the result that the response, as well as the angular position of the motor, are positive in operation and exact from the point of view of the angular position, or angle of advance, made by the rotor in response to a communicated pulse.

It is an object of this invention to provide stepping motors responsive to a series of pulses for altering the angular position of rotors and for holding this rotor in a fixed angular position when it is desired to have the rotor remain at rest.

It is an additional object of this invention to provide stepping motors which have high torque and speed of operation, and are capable of assuming exact angular positions in response to the pulses for altering the angular position of the rotors.

The novel features which are believed to be characteristic of the invention, both as to its organization and method of operation, together with further objects and advantages thereof, may best be understood by reference to the following description taken in connection with the accompanying drawings in which:

Fig. 1 is a sectional view of a stepping motor taken in a plane of field poles and rotor, this plane being perpendicular to the axis of rotation;

Fig. 2 is a diagrammatic presentation of the angular positions of the rotor with respect to the stator for the stepping motor illustrated in Fig. 1;

Fig. 3 is a plane cross-sectional view of a modified version of a stepping motor with the section taken in a plane perpendicular to the axis of rotation;

Fig. 4 is a side cross-sectional view of the motor illustrated in Fig. 3 with the section taken along line 4—4 indicated in Fig. 3.

Referring to Fig. 1, the motor consists of a stator frame 10 having a plurality of poles 12 through 17. Each pole has a field winding or field coils illustrated at 18 through 23. The field coils 18 and 21 are connected in series over conductors 24, 25, and 26, conductor 26 being connected to a source 28 of pulses which generates a series of pulses 29, 30 and 31. The diametrically opposed poles 14 and 17, and 13 and 16, are also connected to their respective series circuits and to source. The pole pieces 14 and 17 are connected to source 28 over conductors 32, 33, and 34. The pole pieces 13 and 16 are connected to source 28 over conductors 36, 37, and 38. From the description of these connections, it follows that the diametrically opposed poles are connected in series, poles 12 and 15 having a pulse 29 impressed on their windings. Similarly, pulse 30 is impressed on field coils 20 and 23 while pulse 31 is impressed on field coils 19 and 22. Each pole piece has three teeth, such as teeth 39, 40, and 41 of pole 14. These teeth are uniformly spaced around the periphery of the pole pieces. Similar teeth are also present around the periphery of the rotor, the rotor teeth being also uniformly distributed around the rotor's periphery. The angular spacing between the tips of all teeth are equal to each other, with the result that it becomes possible to position the teeth of the rotor in the radial line position, with respect to the teeth on the poles, in the manner illustrated in Fig. 1 in connection with poles 12 and 15. The pole pieces 13 and 16 are so positioned on the circumference of the stator that the teeth of these pole pieces are substantially ⅓ of an angular distance 46 or 47 away from the corresponding teeth of rotor 11. The three teeth 60, 61, and 62 of the pole piece 13, therefore, are ⅓ of a pitch distance further clockwise on stator 10 than the corresponding teeth 63, 64, and 65 on the rotor. The same is true of the relationship between teeth 51, 52, and 53 on pole piece 16, and teeth 54, 55, and 56 on the rotor. The teeth on the poles 14 and 17 are advanced even further in the clockwise direction than the teeth of poles 13 and 16, this larger distance being equal to ⅔ of the pitch distance. This being the case, tooth 57, for example, is ⅓ of a pitch distance from tooth 58, and ⅔ of a pitch distance from tooth 59, etc. This is illustrated at A in Fig. 2, where the three pole pieces 12, 13, and 14, as well as the circumference of the rotor, have been unrolled to form a straight line for illustrating more clearly the respective positions of the teeth on the stator and on the rotor. Examination of position A in Fig. 2 discloses that when the teeth 71 through 73 of pole 12 are in perfect alignment with the teeth 74 through 76 of the rotor, tooth 63 of the rotor is ⅓ of a pitch distance away from tooth 60 of pole piece 13, tooth 64 of the rotor is ⅓ of a pitch distance from tooth 61, and ⅔ of a pitch distance from tooth 69, etc. At the very same time, tooth 68 is ⅓ of a pitch distance from tooth 39, and ⅔ of a pitch distance from tooth 40 of pole 14. The poles 12 and 15 are known as detent poles and are normally energized by signal 29 whenever the motor is at rest. Therefore, the position of the rotor, with respect to the stator at A in Fig. 2, corresponds to the rest position since the magnetization of the detent pole causes the rotor and stator teeth to align with each other in the manner illustrated at A in Fig. 2. Since the poles 13 and 14 are not energized at the time of rest, and are adjusted to the previously described offset positions, it follows that they will have no effect on the rotor. When the detent poles become de-energized, poles 13 and 16 become energized by a signal 31, and the rotor, therefore, is accelerated to the position illustrated at B in Fig. 2, with the teeth 60, 61, and 62 of pole 13 becoming aligned with teeth 63, 64, and 65 on the rotor. This action advances the rotor in a clockwise direction an angular distance equal to ⅓ of a pitch distance. The poles 13 and 16 then become de-energized and the poles 14 and 17 become energized by signal 30, with the result that teeth 39, 40, and 41 on pole 14 become aligned with the teeth 67, 68, and 69 on the rotor. Since tooth 70 on the rotor is ⅓ of a pitch distance from tooth 41 in Fig. 2-A, and a full pitch distance from tooth 41 in Fig. 2-C, it follows that the rotor is advanced ⅔ of a pitch distance by the deenergization of the detent poles, energization of the pole pieces 13 and 16 by signal 31, and subsequent energization of the pole pieces 14 and 17 by signal 30. Final energization of the poles by the restoration of signal 29 to its original value advances the rotor in a clockwise direction an angular distance equal to ⅓ of a pitch distance and completes the single stepping cycle of the motor.

In the above stepping cycle, rotor 11 has been turned clockwise a full pitch distance because signal 31 preceded signal 30. It is only necessary to reverse the sequence of signals 30 and 31 in order to advance rotor 11 in the counter-clockwise direction rather than clockwise direction. This is so because with signal 30 leading signal 31, signal 30 will be impressed first on the poles 14 and 17, and since, at this time, tooth 68 is ⅓ of the pitch distance from tooth 39, energization of pole 14 will at once align tooth 68 with tooth 39 with the concomitant counter-clockwise rotation of rotor 11.

Figs. 3 and 4 disclose another version of the stepping motor. In this version, the motor consists of a stator 300, poles 301, 302, 303, and 304, a central field pole 306 having teeth 346, 348, etc., and a cup-shaped rotor 308 mounted on a rotatable shaft 310, provided with a driving gear 312. Each pole of stator 300 is provided with two teeth, such as teeth 313 through 320, with the gap between the pole teeth being sufficiently wide to allow stepping of rotor 308 either in the clockwise or counter-clockwise direction by means of the rotor teeth, such as tooth 321. The teeth of rotor 308 are uniformly spaced around the circumference of the rotor, and have an angle of pitch equal to the angle of pitch of the teeth of the poles of stator 300 and of central field pole 306. The angular distance between all teeth on the poles, the rotor, and the central field pole, are all equal, and the length of the arc spanned by the angle between the teeth on the rotor, as measured along the outer periphery of the rotor, is twice the width of the teeth on the rotor. The teeth on the central field pole, such as teeth 346, 348, etc., are positioned so that the teeth on the poles on the rotor and on the central field pole would be in complete alignment with respect to each other when the teeth on the rotor are placed in such angular position that the reluctance of the circuit is at a minimum. The teeth on the central field pole and the teeth on rotor 308, for obtaining the stepping action on the rotor, are in complete alignment with the teeth on the poles 301 and 303, line 328 being the axis line of poles 301 and 303. A line 324 is at right angles to line 328. Pole 304 is angularly displaced by an angle 330 with respect to line 324, and pole 302 is angularly displaced by an angle 326 with respect to line 324, angle 326 being equal to angle 330 and being equal to ⅓ of the pitch distance between the teeth on rotor 308. In the illustrated example, angles 326 and 330 are on the right side of line 324 as viewed in the drawing, or stated differently, poles 302 and 304 are nearer to pole 301 than to pole 303. With the illustrated angular positions of the poles, it follows that poles 301 and 303 are the detent poles, and poles 302 and 304 are stepping poles. This follows from the fact that when rotor 308 is in the position illustrated in Fig. 3, the teeth of the rotor are in perfect alignment with the teeth on poles 301 and 303, and with the teeth on central field pole 306; therefore, with signal 332 impressed on the detent poles, rotor 308 will be held firmly in alignment with the detent poles. When signal 334 is impressed on pole 304, teeth 336 and 338 of the rotor will at once align themselves with teeth 317 and 318 on pole 304, and teeth 350 and 352 on central field pole 306, and rotor 308 will move in a counter-clockwise direction through an angle equal to the angle spanned by a single rotor tooth. This will advance teeth 340 and 342 of the rotor in such position that the left side of tooth 340 will be in alignment with line 324. Accordingly, when signal 344 is impressed on pole 302, teeth 340 and 342 will move counter-clockwise through an angle equal to the angle spanned by a single tooth, and will become aligned with the respective teeth on pole 302 and central field pole 306. As in the case of Fig. 1, whenever it is desired to rotate rotor 308 in the clockwise direction, pulse 344 should precede pulse 334. In such case, pole 302 will be energized first, and tooth 340 will at once move in a clockwise direction for aligning itself with tooth 314 on pole 302 and with tooth 346 on central field pole 306.

The advantage of the stepping motor disclosed in Figs. 3 and 4 resides in its having a higher torque than the motor illustrated in Fig. 1. This is so because of the use of the central field pole 306 and especially of the teeth, such as teeth 346, 350, 352, etc., along the periphery of the central field pole 306, and the teeth along the inner periphery of rotor 308. With this rotor construction, the rotor will be pulled into proper angular position not only because of the magnetic attraction exerted by the teeth on the poles, such as teeth 314, 315, 316, etc., but also by the teeth on the periphery of the central field pole, such as teeth 350 and 352, etc., because these teeth offer a lower reluctance path to the field produced by the stepping poles 302 and 304. The weight of the rotors 308 and 11 can be reduced to a very low value in either case, which enables the rotors to respond to the magnetic attraction more readily, as well as to the stopping of rotation.

While three teeth per pole are illustrated in Fig. 1, and two teeth per pole are illustrated in Fig. 3, it is obvious that a larger number of teeth may be used on the poles, as well as on the rotor, in which case the angle of advance per pulse will be reduced by the amount proportional to the increase in the number of teeth used on the pole. Similarly, the number of teeth and gaps between the teeth per pole may be reduced to one tooth and one gap, which is the absolute minimum that would produce the desired stepping action.

It should be mentioned also that pulses 30, 31, 334, and 344 may be made shorter than the pulses illustrated in Figs. 1 and 3, and their amplitude either increased or decreased to produce a continuous rotation of the rotor between the time when the amplitude of signal 29 or signal 332 is reduced to zero, and the time when the amplitude of the signal is restored to its original magnitude. Circuits for producing pulses for rotating the rotors either in clockwise or counter-clockwise direction are disclosed in the copending application for patent of Thomas E. Woodruff filed November 13, 1952, on Direct-Current Electronic Integrating System, Serial No. 320,311.

Comparison of the motors in Figs. 1 and 3, discloses that the stepping action may be accomplished either by spacing all stepping poles, as well as the detent poles, uniformly around the circumference of a stator and by making the linear pitch of the teeth on the rotor sufficiently different from the linear pitch of the teeth on the poles, which is the case in Fig. 1, or by displacing the stepping poles by a proper angle such as angles 324 and 330 in Fig. 3. In either case, the angle of pitch of all teeth may be made equal.

What is claimed as new is:

1. A stepping motor comprising: a cylindrical stator having at least first, second, and third poles spaced around the inner circumference thereof, and a field winding for each of said poles, each of said poles having at least one pole tooth on the inner end thereof; a centrally positioned field pole having a plurality of angularity spaced teeth projecting beyond the outer periphery of said field pole, the total number of teeth on said field pole corresponding to the total number of teeth on said first, second, and third poles of said stator, the teeth on said field pole being radially aligned with the corresponding teeth on the poles of said stator, respectively; and a rotor concentrically positioned between said stator and said field pole, said rotor having at least first, second, and third inner teeth on the inner surface thereof and at least first, second, and third outer teeth on the outer surface thereof, said first, second, and third outer teeth being radially aligned with said first, second, and third inner teeth of said rotor, respectively, said first outer tooth being radially aligned with the pole tooth on said first poles of said stator, said second and third outer teeth of said rotor being angularly displaced predetermined distances from the pole teeth on said second and third poles, respectively, of said stator, the alignment of said second outer tooth of said rotor with the pole tooth of said second pole of said stator, upon energization of the field winding associated with said second pole producing a clockwise rotation of said rotor, and the alignment of said third outer tooth of said rotor with the pole tooth of said stator, upon energization of the field winding associated with said third pole, producing a counter-clockwise rotation of said rotor.

2. A stepping motor comprising: a cylindrical stator having first, second, and third poles spaced around the inner circumference of said cylinder, and a field winding for each of said poles, each of said poles having a pair of angularly spaced pole teeth on the inner circumference of each pole, the angular spacing between the teeth of each pair of pole teeth being equal, said second and third poles being angularly spaced, clockwise and counter-clockwise, respectively, from said first pole, an amount equal to 90° less ⅓ the angular spacing between each pair of pole teeth; a field pole positioned concentrically with respect to said cylindrical stator and having a plurality of angularly spaced teeth on the outer surface thereof, one tooth for each tooth on said stator, each tooth on said field pole being radially aligned with the corresponding tooth on said stator; and a rotor positioned between and concentric with said stator and said field pole, said rotor having a plurality of pairs of angularly spaced teeth thereon, the teeth of each of said plurality of pairs of teeth being radially aligned and being positioned on the inner and outer surfaces, respectively, of said rotor, the angular spacings between adjacent pairs of teeth on said rotor being uniform and being equal to the angular spacing between the teeth of each pair of pole teeth.

3. A stepping motor comprising: a stator shaped as a hollow cylinder, said cylinder having first, second, third, and fourth poles projecting beyond the inner surface of said cylinder, each of said stator poles having two teeth projecting beyond the inner surface thereof, said teeth being angularly displaced from each other along the inner circumference of the respective pole, the angular spacing between the two teeth on each pole constituting the angular pitch and being equal for all the poles of said stator, said first and third poles being diametrically opposed to each other, the radial center line of said second pole being displaced in a clockwise direction from the radial center line of said first pole by an angle equal to 90°+⅓ of the angle of said angular pitch and the radial center line of said fourth pole being displaced in a counter-clockwise direction from the radial center line of said first pole by an angle equal to 90°+⅓ of said angle of said angular pitch; a stationary cylindrical central field pole mounted in concentric relationship with respect to said stator, said central field pole having eight teeth projecting beyond the outer cylindrical surface of said field pole, the teeth on said field pole being angularly displaced from each other and radially aligned with the teeth on said stator poles; and a rotor rotatably mounted between the teeth of said stator poles and the teeth of said field pole, said rotor comprising a cylindrical band and a plurality of teeth constituting a part of said cylindrical band, said teeth projecting beyond the outer and the inner surfaces of said band, said teeth being uniformly angularly distributed around the periphery of said band, the angular pitch of the teeth on said band and the angular pitch of the teeth on said field pole being equal to the angular pitch of the teeth on said stator poles.

4. The stepping motor defined in claim 3 which further includes first, second, third, and fourth field windings for said first, second, third, and fourth stator poles, respectively, and electrical conducting means for electrically interconnecting said first and third field windings for simultaneous energization.

SIEGFRIED HANSEN.

REFERENCES CITED

The following references are of record in the file of this patent:

UNITED STATES PATENTS

| Number | Name | Date |
|---|---|---|
| 1,440,729 | French | Jan. 2, 1923 |
| 1,708,334 | Spencer | Apr. 9, 1929 |
| 1,894,979 | Chubb | Jan. 24, 1933 |
| 1,959,449 | Stoller | May 22, 1934 |
| 2,012,207 | Walton | Aug. 20, 1935 |
| 2,249,029 | Mullerheim | July 15, 1941 |
| 2,321,699 | O'Brien | June 15, 1943 |
| 2,343,325 | Ranseen | Mar. 7, 1944 |